United States Patent
Paulig et al.

(10) Patent No.: US 11,578,697 B2
(45) Date of Patent: Feb. 14, 2023

(54) KITE SYSTEM AND METHOD FOR OPERATING A KITE SYSTEM

(71) Applicant: SkySails Power GmbH, Hamburg (DE)

(72) Inventors: Xaver Paulig, Hamburg (DE); Christoph Heeckt, Seevetal (DE); Bernd Specht, Hamburg (DE); Felix Braun, Melsdorf (DE)

(73) Assignee: SkySails Power GmbH, Hamburg (DE)

( * ) Notice: Subject to any disclaimer, the term of this patent is extended or adjusted under 35 U.S.C. 154(b) by 1034 days.

(21) Appl. No.: 16/217,268

(22) Filed: Dec. 12, 2018

(65) Prior Publication Data

US 2019/0176047 A1 Jun. 13, 2019

(30) Foreign Application Priority Data

Dec. 12, 2017 (EP) .................................... 17206681

(51) Int. Cl.
- *B63H 9/071* (2020.01)
- *F03D 13/20* (2016.01)
- *F03D 5/02* (2006.01)
- *B64C 39/02* (2023.01)
- *B64C 31/06* (2020.01)

(52) U.S. Cl.
CPC ............. *F03D 13/20* (2016.05); *B63H 9/071* (2020.02); *B64C 39/022* (2013.01); *F03D 5/02* (2013.01); *B64C 31/06* (2013.01); *B65H 2701/356* (2013.01); *F05B 2240/311* (2013.01); *F05B 2240/921* (2013.01); *Y02E 10/70* (2013.01)

(58) Field of Classification Search
CPC ........ B63H 9/069; B63H 9/071; A63H 27/08; A63H 27/087
See application file for complete search history.

(56) References Cited

U.S. PATENT DOCUMENTS

| | | | | |
|---|---|---|---|---|
| 1,993,414 | A * | 3/1935 | Respess | B64C 39/022 244/33 |
| 2,279,152 | A * | 4/1942 | Whitehurst | B07C 3/085 186/16 |
| 2,850,819 | A * | 9/1958 | Payne | G09F 3/00 40/300 |
| 2002/0033019 | A1 | 3/2002 | Mizzi | |
| 2003/0025039 | A1* | 2/2003 | Fischer | A63H 27/002 244/155 R |

FOREIGN PATENT DOCUMENTS

| | | |
|---|---|---|
| CN | 102220938 A | 10/2011 |
| DE | 10162859 C1 | 6/2003 |

OTHER PUBLICATIONS

European Search Report dated May 28, 2018 for European Patent Application No. 17206681.3.

* cited by examiner

*Primary Examiner* — Andrew Polay
(74) *Attorney, Agent, or Firm* — Alix, Yale & Ristas, LLP

(57) ABSTRACT

A kite system having a kite (14) and a hauling rope (15) which extends between the kite (14) and a tow point (16). A marking holder (25) is disposed between the tow point (16) and the kite (14). The marking holder (25) is conceived for changing between an entrained state in relation to the hauling rope (15), and a free-running state in relation to the hauling rope (15). A fitting installation (31) initiates a changeover between the entrained state and the free-running state of the marking holder (25). The invention moreover relates to a method for operating a kite system.

16 Claims, 6 Drawing Sheets

KITE SYSTEM AND METHOD FOR OPERATING A KITE SYSTEM

BACKGROUND

The invention relates to a kite system having a kite and a hauling rope. The hauling rope extends between the kite and a tow point. The invention moreover relates to a method for operating a kite system.

In the case of such a kite system the kite can fly away freely, wherein the spacing from the tow point is defined by the length of the hauling rope. The hauling rope extends through the air space between the tow point and the kite, on account of which a threat to air traffic can result.

SUMMARY OF THE INVENTION

The invention is based on the object of presenting a kite system and a method for operating a kite system by way of which the risk of a threat to air traffic is reduced. Proceeding from the mentioned prior art, the object is achieved by the features of the independent claims. Advantageous embodiments are set forth in the dependent claims.

In the case of the kite system according to the invention, a marking holder is disposed between the tow point and the kite. The marking holder is conceived for changing between an entrained state in relation to the hauling rope, and a free-running state in relation to the hauling rope. The kite system comprises a fitting installation which is conceived for initiating a changeover between the first state and the second state of the marking holder.

By way of the invention it becomes possible for the hauling rope to be equipped with markings which are more noticeable to air-traffic than the hauling rope per se. Air traffic is offered the possibility of being alerted to the hauling rope in a timely manner and of designing the further flight path such that a collision with the hauling rope is avoided. The marking holder in the entrained state moves conjointly with the hauling rope such that the marking holder can be moved to the required height by dispensing the hauling rope. The hauling rope in the free-running state of the marking holder can move independently of the marking holder. The hauling rope can thus be recovered without the recovery being compromised by the marking holder, for example.

The marking holder can have a marking. The marking can be a visual marking, for example in the form of a light, a ball, or a flag. Markings which can be detected in another manner, for example a wireless marking or a radar marking, are also possible. In one embodiment of the invention the marking is releasably connected to the marking holder. This can be meaningful in particular when the marking has a large area, such as is typically the case with a ball or a flag. The handling of the marking holder in these cases can be facilitated in that the marking is released from the marking holder. A marking that is fixedly connected to the marking holder is also possible, said marking not being released from the marking holder in the normal operation of the kite system. This can be expedient, for example, when the marking is a light.

The kite system can comprise a blocking mechanism that acts between the hauling rope and the marking holder. In a non-engaged state of the blocking mechanism the marking holder is free-running relative to the hauling rope. In an engaged state of the blocking mechanism the marking holder is entrained relative to the hauling rope. Free-running means that there is no mechanical connection between the marking holder and the hauling rope which acts in the longitudinal direction of the hauling rope. The hauling rope in the free-running state can thus be recovered or dispensed without the marking holder moving. As opposed thereto, in the engaged state of the blocking mechanism there is a mechanical connection between the marking holder and the hauling rope which acts in the longitudinal direction of the hauling rope. When dispensed or recovered, the marking holder thus moves conjointly with the hauling rope. The blocking mechanism can be an element of the marking holder. A blocking mechanism that is separate from the marking holder is also possible.

It can suffice that the blocking mechanism is effective only in one direction, for example such that any downward slipping of the marking holder is prevented. An upward movement is normally counter to gravity, such that the blocking mechanism does not necessarily have to be effective in that direction. Embodiments in which the blocking mechanism acts in both directions are also part of the invention.

The blocking mechanism can be held in a state that is engaged with the hauling rope by a spring force. An engagement element of the blocking mechanism in the engaged state can be under tension by a spring, wherein the spring tension is preferably so large that the marking holder is reliably connected to the hauling rope, on the one hand, and on the other hand is not so large that the external face of the hauling rope is damaged. The blocking mechanism can be designed, for example, as a Curry clamp (bulldog jam cleat), in which the hauling rope in the engaged state is enclosed between two or more engagement elements. The blocking mechanism in the non-engaged state can be kept at a spacing from the hauling rope by overcoming the spring force.

In one embodiment of the invention the blocking mechanism of a first marking holder is held in a non-engaged state by engaging with a second marking holder. The blocking mechanism of the first marking holder can be designed such that said blocking mechanism upon cancellation of the engagement with the second marking holder automatically converts to the engaged state.

The second marking holder can comprise a mandrel which engages in a clearance of the first marking holder. The mandrel can be disposed so as to be concentric with the hauling rope. An engagement element of the blocking mechanism of the first marking holder can be kept at a spacing from the surface of the hauling rope by way of the mandrel, such that the first marking holder is in the free-running state. When the first marking holder is stripped from the mandrel, the blocking mechanism can thus come to engage with the hauling rope such that the marking holder converts to the entrained state.

The kite system can be conceived such that the kite can utilize the comparatively strong winds prevailing at great heights. For example, the spacing between the kite and the tow point can be larger than 100 m, preferably be larger than 200 m, furthermore preferably be larger than 500 m, when the hauling rope is dispensed to the full length. The marking holder in the entrained state can have a spacing from the upper end of the hauling rope which is larger than 20 m, preferably is larger than 50 m, furthermore preferably is larger than 80 m. A control gondola can be disposed between the upper end of the hauling rope and the kite. The kite can be connected to the control gondola by way of a plurality of control lines. The control gondola can be conceived for modifying the length of individual or a plurality of control lines, so as to control the kite along predefined flight paths. The spacing between the tow point and the marking holder can be larger than 20 m, preferably be larger than 50 m, furthermore preferably be larger than 80 m, when the hauling rope is in the fully dispensed state.

The kite system can be conceived such that the hauling rope upon launching the kite is initially dispensed for a distance when the marking holder is in the free-running state. The distance dispensed in the free-running state can be, for example, larger than 20 m, preferably be larger than 50 m, furthermore preferably be larger than 80 m.

A further portion adjoins the freely dispensed portion of the hauling rope, said further portion being specified for supporting a marking holder. The kite system according to the invention is preferably conceived such that a changeover between the free-running state and the entrained state of the marking holder is initiated after the end of the freely dispensed portion. The marking holder can then be carried to the desired height by way of the further dispensing of the hauling rope.

The kite system according to the invention can comprise a plurality of marking holders which are disposed between the kite and the tow point. The mutually adjacent marking holders that are entrained with the hauling rope can have a mutual spacing which is larger than 20 m, preferably is larger than 50 m, furthermore preferably is larger than 80 m. A long freely dispensed portion is thus in each case followed by a short portion which supports a marking holder.

The kite system can comprise a monitoring installation which monitors the length of the currently freely dispensed portion. The currently freely dispensed portion extends either between the upper end of the hauling rope and the tow point, or between the lowermost entrained marking holder and the tow point. It can be derived from the length of the currently freely dispensed portion at which point in time a changeover of a marking holder between the free-running state and the entrained state is required. In particular, a point in time at which the lowermost marking holder changes from the entrained state to the free-running state can be determined when recovering the tow rope. A point in time at which a marking holder changes from the free-running state to the entrained state can be determined when dispensing the hauling rope.

The fitting installation upon receiving a control command from the monitoring installation can be conceived for initiating a changeover between an entrained state and a free-running state of a marking holder. It is also possible for the hauling rope to be equipped with an identification from which the fitting installation can derive a point in time at which a changeover between a free-running state and an entrained state of a marking holder is initiated.

The fitting installation can be conceived for initiating the changeover of the marking holder from the free-running state to the entrained state, and/or for initiating the changeover of the marking holder from the entrained state to the free-running state. A changeover between both states can be initiated in that an activation part of the fitting installation acts on the marking holder.

The fitting installation can be conceived such that in particular the changeover from the free-running state to the entrained state is initiated by means of an active activation by way of the fitting installation. The kinetic energy of the marking holder in the conversion from the entrained state to the free-running state can be utilized for causing the conversion between the states. A conversion from the entrained state to the free-running state typically arises when the hauling rope is recovered. The marking holder in this instance approaches the tow point at the speed at which the hauling rope is recovered. The speed is usually reduced to zero along with the conversion to the free-running state. The kinetic energy released in the deceleration can be utilized for causing the conversion from the entrained state to the free-running state. For example, the marking holder can run onto a mandrel which cancels a blocking mechanism between the marking holder and the hauling rope. Additionally or alternatively thereto, an active actuation by way of the fitting installation can be provided so as to cause the conversion from the entrained state to the free-running state.

The fitting installation can be conceived for displacing the marking holder so as to initiate a changeover between the two states. The displacement can be performed in the longitudinal direction of the hauling rope. The blocking mechanism can be released in that the fitting installation displaces the marking holder. The marking holder can automatically convert to the other state after the blocking mechanism has been released. This can in particular be a conversion from the free-running state to the entrained state. The fitting installation can comprise a latching lever for displacing the marking holder.

The kite system according to the invention can comprise a magazine which is conceived for receiving a plurality of marking holders which are in the free-running state. The magazine can be designed such that the marking holders disposed in the magazine surround the hauling rope. For example, the marking holders can comprise a bore through which the hauling rope is routed.

The embodiment comprises embodiments in which a marking holder can be released from the hauling rope only in that the hauling rope is pulled out of the marking holder in the longitudinal direction. In other embodiments the marking holder comprises a radial opening such that the marking holder can be released from the hauling rope by a movement in the radial direction.

When the marking holders are capable of being released from the hauling rope when in operation, the magazine can be specified such that the marking holders are mounted at a location that is separate from the hauling rope.

The tow point can comprise a tow point disk by way of which the hauling rope is deflected. The tow point disk can be disposed such that a first portion of the hauling rope extends in a straight path from the tow point disk in the direction of the kite. A second portion of the hauling rope can extend in a direction deviating therefrom to another element of the kite system. The tow point disk can be mounted so as to be pivotable about a tow point axis. The tow point axis can enclose a right angle in relation to a central axis of the tow point disk. The spacing between the central axis of the tow point disk and the tow point axis can correspond to the radius of the tow point disk. The tow point axis can coincide with the direction in which the second portion of the hauling rope extends.

When the kite system according to the invention comprises a transfer arm for moving the marking holder from the hauling rope to the magazine, the transfer arm can be pivotably mounted, wherein the pivot axis is aligned so as to be parallel with the central axis of the tow point disk, in particular aligned so as to be coaxial with the central axis of the tow point disk.

The tow point can comprise a hauling rope exit. The hauling rope exit can form the exit point toward which the hauling rope coming from the kite extends. The hauling rope between the exit point and the kite is preferably not subjected to any further guidance. The hauling rope exit, conjointly with the tow point disk, can be mounted so as to be pivotable about the tow point axis. The kite system according to the invention is preferably conceived such that a changeover between the entrained state and the free-running state of the marking holder is carried out so as to be adjacent to the hauling rope exit.

When a marking holder that is in the free-running state is mounted so as to be adjacent to the hauling rope exit, the tow point becomes more cumbersome in relation to pivoting movements about the tow point axis. It can therefore be advantageous for the marking holders to be mounted in a magazine, the radial spacing of said magazine from the tow point axis being smaller than the radial spacing between the tow point axis and the hauling rope exit.

The tow point can be a component part of station that is fixedly disposed on the ground. It is also possible for the tow point to be disposed on a floating platform. The floating platform can be a ship, wherein the kite system is utilized for supporting the propulsion of the ship. It is also possible for the hauling rope to be connected by way of the tow point to a generator so as to generate electrical energy. Alternatively, the hauling rope can also be connected to an installation by way of which the energy made available by the kite system is converted to another form of energy.

It can be advantageous to the generation of energy for the kite system to be operated in an alternating operation, wherein phases in which the hauling rope is dispensed alternate with phases in which the hauling rope is recovered in the alternating operation. When recovering, the kite can be moved to a flight position in which said kite exerts only a minor tensile force. When dispensing, the kite can be controlled such that said kite exerts a high tensile force. The high tensile force exerted when dispensing can be converted to another form of energy. The hauling rope portion which is dispensed or recovered, respectively, in this alternating operation can be larger than 50 m, preferably be larger than 100 m.

The dispensing or recovering, respectively, can extend across a hauling rope portion in which a marking holder is connected to the hauling rope. The kite system according to the invention can be conceived such that, in alternating operation, a marking holder is moved to the connected state in each dispensing event, and the same marking holder is moved to the free-running state in each recovery event.

The kite system according to the invention can be specified such that the hauling rope speed at which the hauling rope is dispensed or recovered, respectively, is reduced in order to facilitate the changeover between the two states of the marking holder. For example, the hauling rope speed at the point in time at which the state of the marking holder is changed can be lower than the basic speed of the hauling rope by at least 10%, preferably by at least 20%.

The marking holder can have a marking which consumes electric current such as is usually the case with a light, for example. In order for the operation of such a marking to be enabled without any external supply, the marking holder can comprise an electricity accumulator, for example in the form of a battery. The marking holder can have external terminals in order to enable the electricity accumulator to be charged. In order for contacting from the outside to be facilitated, the external terminals can extend in an annular manner about the marking holder. When the marking holder is in the free-running state, the external terminals can be contacted from outside, so as to supply electricity to the electricity accumulator. For example, the magazine of the marking holder can be equipped with suitable electrical conductors.

The start-up of the marking can be coupled to the changeover between the free-running state and the entrained state of the marking holder. For example, the marking can be automatically activated when converting from the free-running state to the entrained state. The marking can be automatically deactivated when converting from the entrained state to the free-running state.

In the operation of the kite system according to the invention it can be necessary for items of control information to be transmitted between a station on the ground and the control gondola. A wireless connection between a control gondola and a station on the ground can be set up for this purpose. It can be advantageous to the reliability of the wireless connection for wireless repeaters to be disposed between the station on the ground and the control gondola. In one embodiment of the invention, one or a plurality of marking holders are equipped with a wireless repeater.

The invention moreover relates to a method for operating a kite system, in which a hauling rope is disposed between a kite and a tow point, and in which a marking holder is moved from a free-running state in relation to the hauling rope to an entrained state in relation to the hauling rope once the hauling rope in the free-running state of the marking holder has been dispensed across a predefined distance.

The method can be refined by further features which are described in the context of the kite system according to the invention. The kite system can be refined by further features which are described in the context of the method according to the invention.

BRIEF DESCRIPTION OF THE DRAWINGS

The invention will be described in an exemplary manner hereunder with reference to the appended drawings and by means of advantageous embodiments. In the drawings.

DETAILED DESCRIPTION

Figure 1:
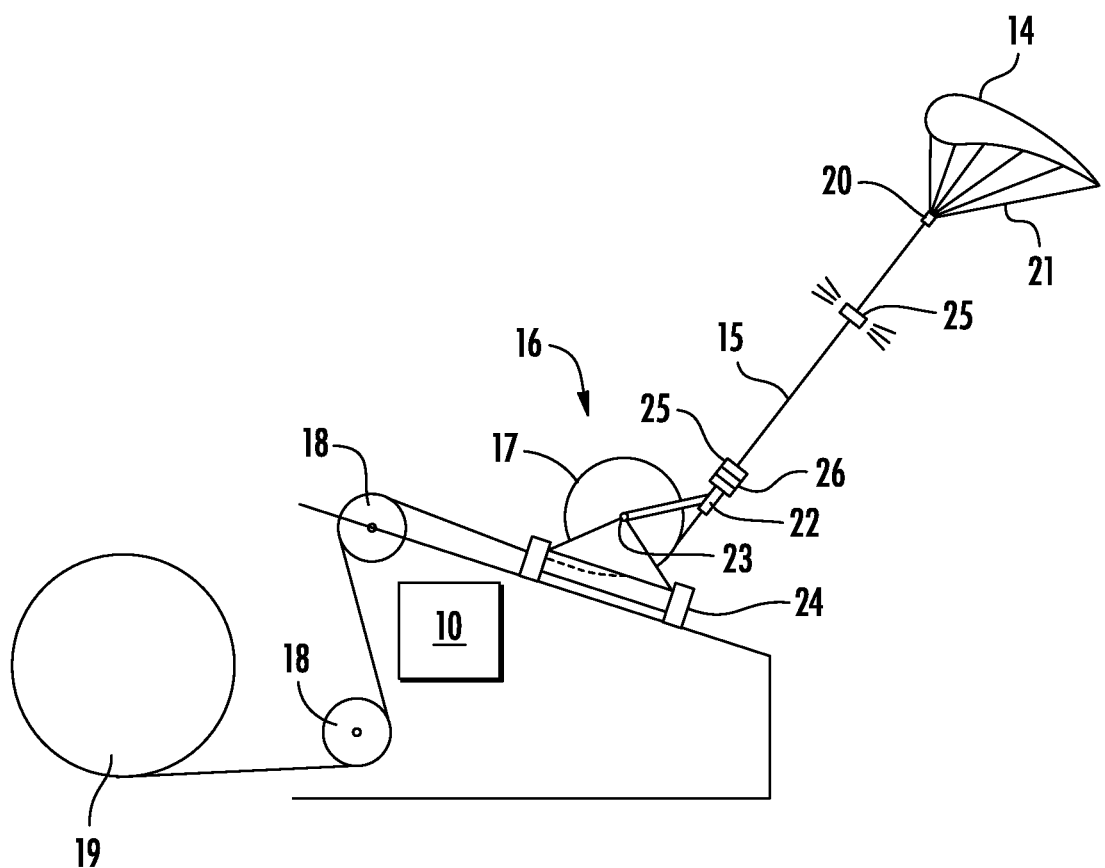
FIG. 1 shows a schematic illustration of a kite system according to the invention.

In the case of a kite system shown in FIG. 1 a kite 14 is connected to a tow point 16 by way of a hauling rope 15. The hauling rope 15 is guided to a hauling rope winch 19 by way of a tow point disk 17 of the tow point 16 and by way of two deflection rollers 18. The upper end of the hauling rope 15 is connected to a control gondola 20. A plurality of control lines 21 extend between the control gondola 20 and the kite 14. The control gondola 20 is conceived for varying the length of individual or a plurality of control lines 21. On account thereof, the aerodynamic properties of the kite 14 are modified, and the kite 14 can be controlled along predefined flight paths. The kite system includes a monitoring installation 10 which monitors a length of hauling rope 15 dispensed or retrieved from the tow point 16, with the length of the hauling rope 15 dispensed or retrieved being used to coordinate functions of the kite system as discussed below.

The kite 14 in the flight movements thereof exerts a tensile fore on the hauling rope 15, said tensile force being transmitted to the hauling rope winch 19. The tensile force can be utilized for setting the hauling rope winch 19 in rotation, and for driving a generator for generating electric energy by way of the hauling rope winch 19. The hauling rope 15 is dispensed herein; the spacing between the kite 14 and the tow point 16 is thus enlarged.

When the hauling rope 15 has been dispensed to the full length thereof, the hauling rope 15 has first to be recovered by a specific length prior to any new generation of energy being possible. The kite 14 in this phase is moved to a position in which said kite 14 exerts a minor tensile force. This can be a position that is approximately vertically above the tow point 16, for example.

Figure 2A:
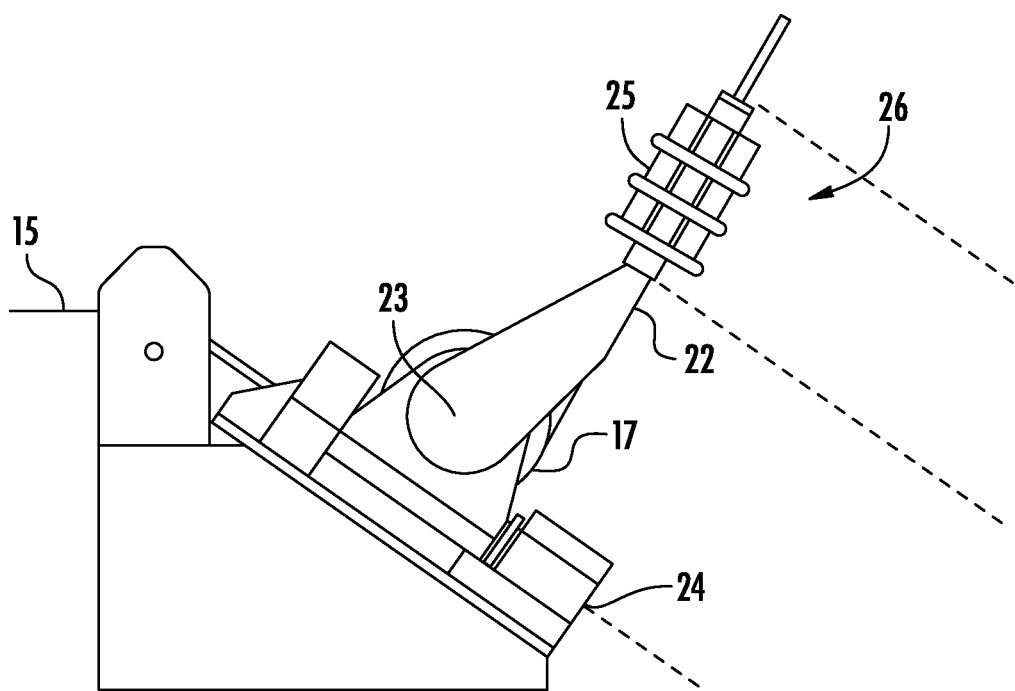
FIG. 2A shows a tow point of a kite system according to the invention in a side view.
Figure 2B:
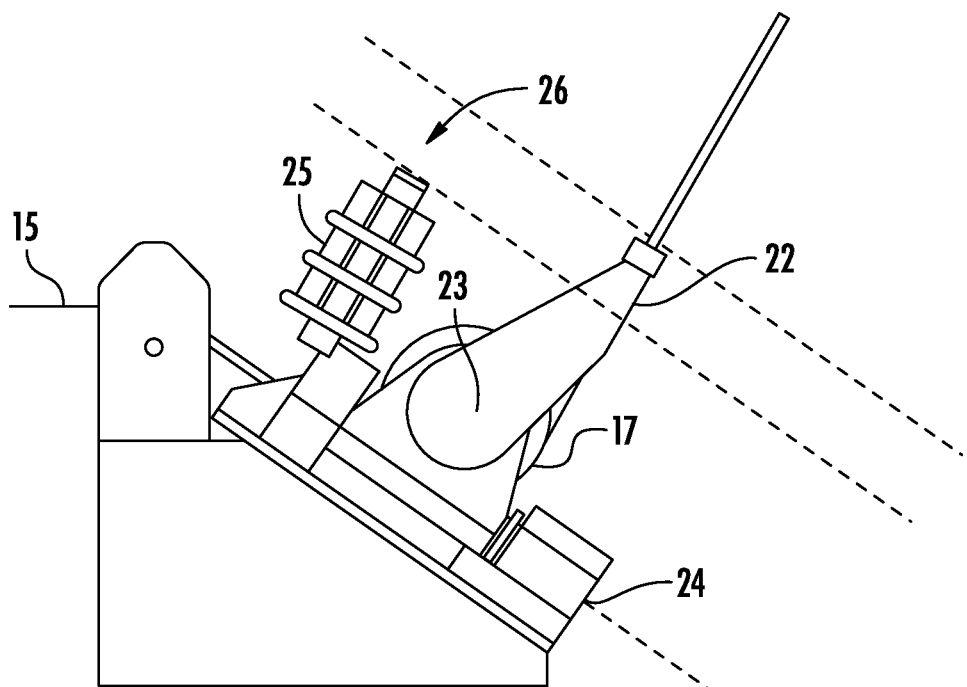
FIG. 2B shows an alternative embodiment of a tow point of a kite system in side view according to the invention.
Figure 3:
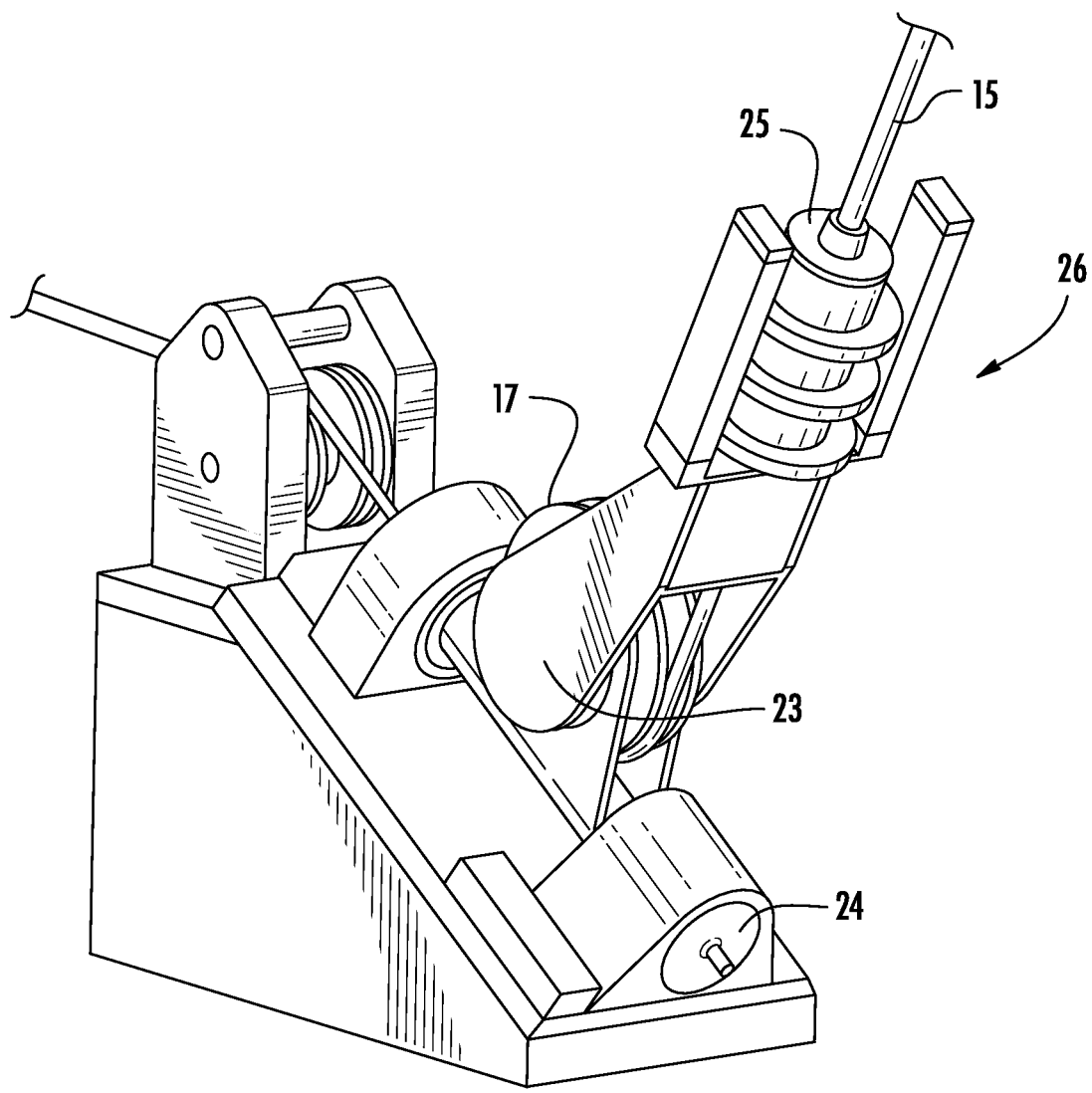
FIG. 3 shows the tow point according to FIG. 2A in a perspective illustration.

The tow point 16 comprises a hauling rope exit 22 which directs the hauling rope coming from the tow point disk 17 in the direction of the control gondola 20. The hauling rope exit 22 is pivotably mounted in order to be able to follow the flight path of the kite 14. As can be best seen in FIGS. 2A, 3, a first pivot bearing 23 is disposed so as to be coaxial with the central axis of the tow point disk 17. A second pivot bearing has the pivot axis thereof in the tow point axis 24. The tow point disk 17 and the hauling rope exit 22 are conjointly pivoted by way of the second pivot bearing. FIG. 2B shows an alternative embodiment of a tow point where the radial spacing of the magazine 26 from the tow point axis 24 is smaller than the radial spacing between the tow point axis 24 and the hauling rope exit 22.

A marking holder 25 which comprises a light 12 is attached approximately halfway between the control gondola 20 and the hauling rope exit 22 to the hauling rope 15. The light signals of the light 12 can be seen from afar. The air traffic is alerted to the hauling rope 15 in a timely fashion and can choose the flight path such that a collision with the hauling rope 15 is avoided. The marking holder 25 is entrained relative to the hauling rope 15. The marking holder 25 thus moves upward when the hauling rope 15 is dispensed, and moves downward when the hauling rope 15 is recovered.

Three further marking holders 25 are received in a magazine 26 that is disposed so as to be adjacent to the hauling rope exit 22. The marking holders 25 in the magazine 26 are in a free-running state relative to the hauling rope 15. Said marking holders 25 thus maintain the positions thereof in the magazine 26 when the hauling rope 15 is dispensed or recovered.

Figure 4:
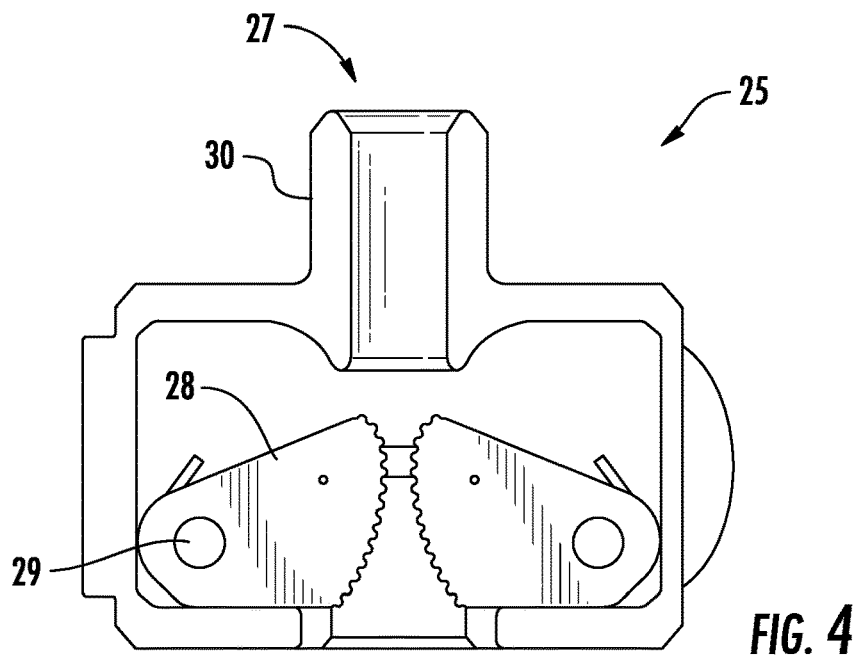
FIG. 4 shows a marking holder of a kite system according to the invention in a sectional illustration.

The marking holders 25 according to FIG. 4 have a central bore 27 which extends through the marking holder 25. The hauling rope 15 in the operation of the kite system according to the invention is routed through the bore 27. The marking holder comprises a blocking mechanism in the form of a Curry clamp (bulldog jam cleat). The Curry clamp (bulldog jam cleat) comprises two clamping jaws 28 which are mounted so as to be pivotable about axes 29, and which are held so as to be spring-loaded in the engagement state shown in FIG. 4. When the hauling rope 15 is routed through the bore 27, the clamping jaws 28 bear on the external side of the hauling rope 15 and thus block the marking holder 25 relative to the hauling rope 15. The marking holder 25 is in the entrained state.

Figure 5:
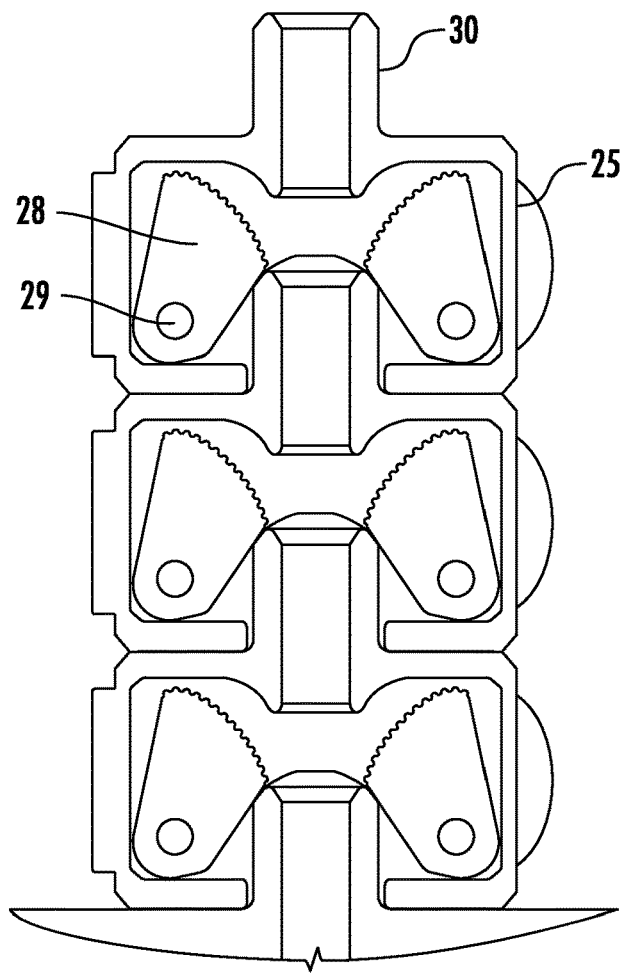
FIG. 5 shows a plurality of marking holders in a sectional illustration.

In order for the marking holder 25 to be moved to the free-running state, the clamping jaws 28 in FIG. 4 are pivoted upward counter to the spring load, such that the clamping jaws 28 no longer contact the hauling rope 15. Three marking holders 25 are in each case shown in the free-running state in FIG. 5. The clamping jaws 28 are in each case held in the upwardly pivoted position by a mandrel 30 of a marking holder 25 that is disposed therebelow. The hauling rope 15 in the free-running state according to FIG. 5 can be dispensed or recovered, respectively, through the marking holders 25, without the marking holders 25 changing the positions thereof.

Figure 6:
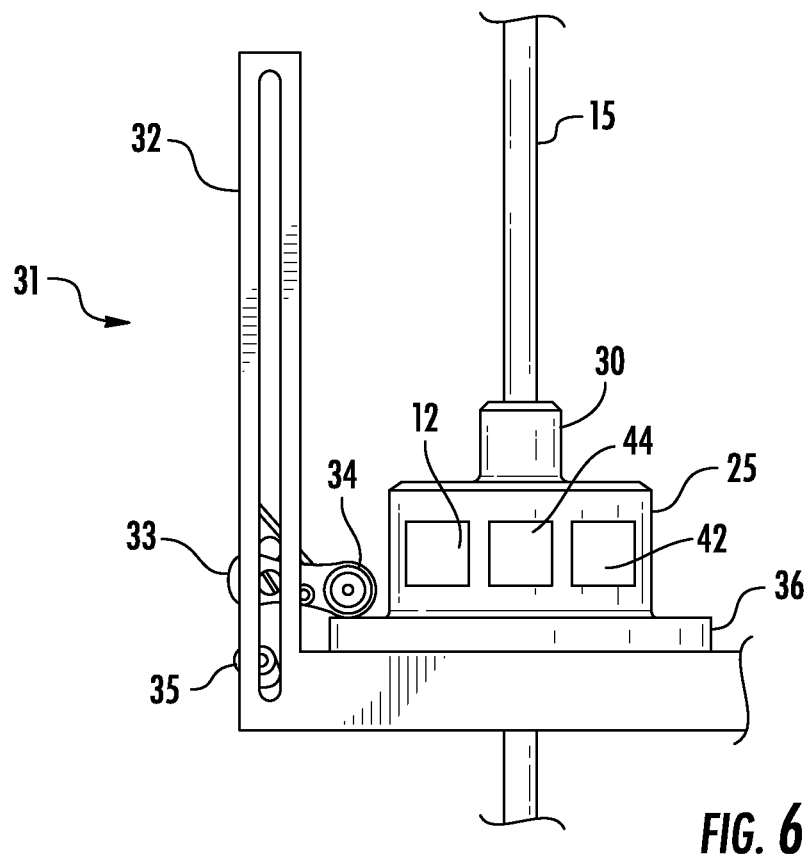
FIGS. 6 and 7 show details of a kite system according to the invention in an enlarged illustration.

In order for the marking holder 25 to be able to change between the free-running state and the entrained state, according to FIG. 6 the kite system according to the invention comprises a fitting installation 31. A guide rail 32 in the fitting installation 31 extends in a manner parallel with the hauling rope 15. A latching lever 35 is guided in the guide rail 32, said latching lever 33 comprising a first leg 34 and a second leg 35. The latching lever 33 is pivoted downward in FIG. 6, such that the first leg 34 of the lever 33 bears on a flange 36 of the marking holder 25. The marking holder 25 is held in the free-running state by the latching lever 33.

When the hauling rope, proceeding from the state shown in FIG. 6, is recovered, a second marking holder 25 is moved toward the fitting installation 31. In order to be able to receive the second marking holder 25, the latching lever 33 is moved somewhat upward in the guide rail 31, and the latching lever 33 is pivoted upward such that the second leg 35 protrudes into the path of the second marking holder 25. When the flange 36 of the second marking holder 25 impacts the second leg 35 of the latching lever 33, the latching lever 33 is thrown and converts to the position according to FIG. 9.

Figure 8:
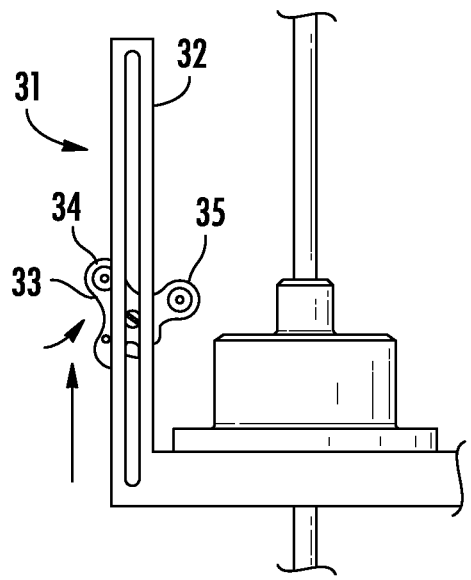
FIGS. 8 to 11 show a schematic illustration of a method sequence according to the invention.
Figure 10:
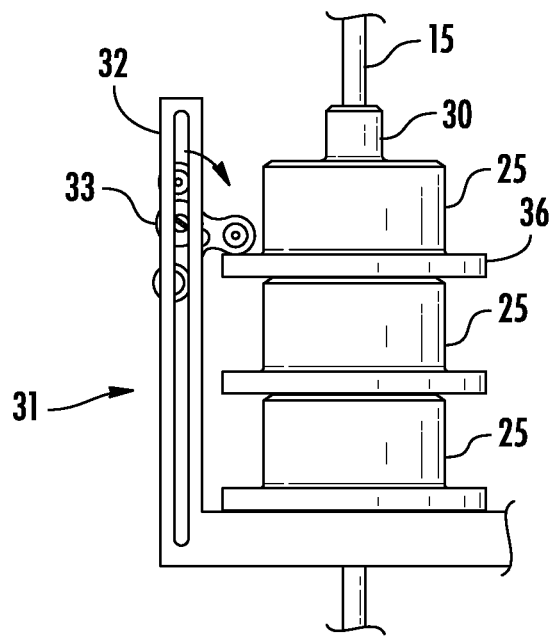

The throwing of the latching lever 33 is performed under the influence of a spring force. The latching lever 33 in FIG. 8 is thus in a tensioned state. The force exerted by the first leg 34 on the flange 36 is rated such that the second marking holder 25 is reliably pushed onto the mandrel 30 of the first marking holder 25. The mandrel 30 of the first marking holder 25 presses the clamping jaws 28 of the second marking holder 25 apart such that the clamping jaws 28 no longer contact the hauling rope 15. The second marking holder 25 is then in the free-running state. The corresponding state after receiving a third marking holder 25 is shown in FIG. 10.

Figure 9:
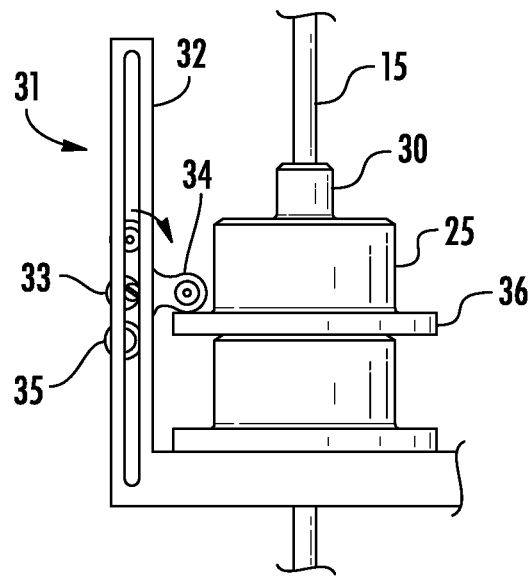

For the reversed changeover from the free-running state to the entrained state, the latching lever 33, proceeding from the position shown in FIG. 9, is driven downward in the guide rail 32. The latching lever 33 is thrown herein such that the second leg 35 exerts a force from below on the flange 36 of the second marking holder 25. The second marking holder 25 is lifted from the mandrel 30 of the first marking holder 25. The blocking of the clamping jaws 28 is cancelled such that the second marking holder 25 converts to the entrained state. The second marking holder 25 is guided upward conjointly with the hauling rope 15 in the further dispensing of the hauling rope 15.

Figure 11:
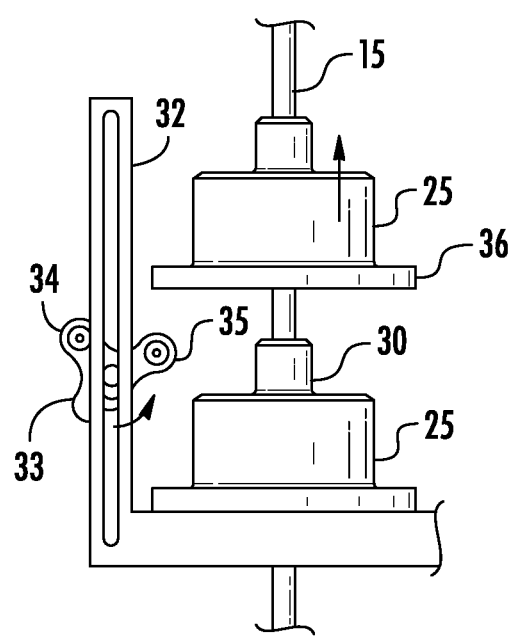

A switch 13 which sets in operation a light 12 that is integrated in the marking holder 25 is activated simultaneously with the conversion from the free-running state to the entrained state shown in FIG. 11. Conversely, the switch 13 is activated in order to put the light 12 out of operation in the conversion from the entrained state to the free-running state.

Figure 7:
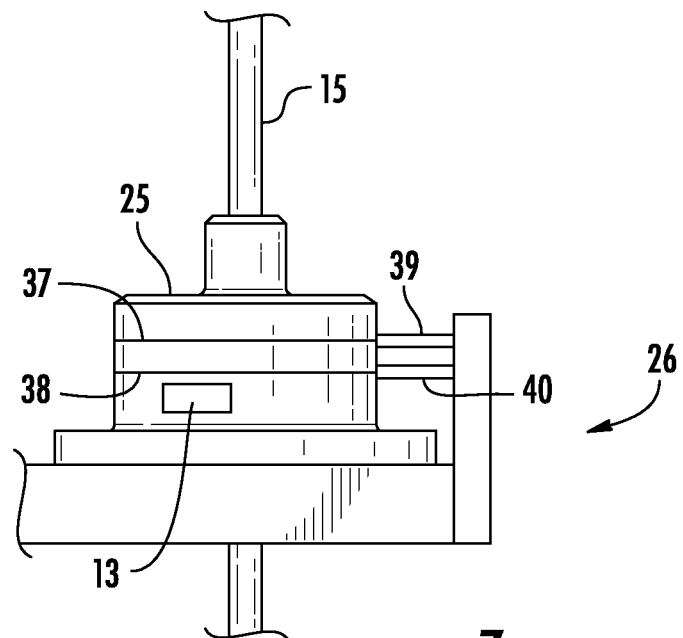

The marking holder 25 in the case of the embodiment according to FIG. 7 is provided with two external terminals 37, 38 which extend in an annular manner about the circumference of the marking holder 25. Two conductors 39, 40 are disposed in the magazine 26, said two conductors 39, 40 contacting the external terminals 37, 38. A battery 42 that is integrated in the marking holder 25 is charged by way of the conductors 39, 40 and the external terminals 37, 38.

The light and optionally further electric components that are integrated in the marking holder 25 are operated by way of the battery 42. An example of a further electronic component is a wireless repeater 44 which is conceived for relaying wireless signals between the ground station of the kite system and the control gondola 20.

What is claimed:

1. A kite system having a kite and a hauling rope, wherein the hauling rope extends between the kite and a tow point, and having a marking holder which is disposed between the tow point and the kite, wherein the marking holder is configured to change between an entrained state in relation to the hauling rope, and a free-running state in relation to the hauling rope, and having a fitting installation that initiates a changeover between the entrained state and the free-running state of the marking holder, wherein the marking holder comprises a plurality of marking holders disposed between the kite and the tow point, and wherein, in the entrained state, a spacing of two neighboring marking holders of the plurality marking holders is larger than 20 m.

2. The kite system of claim 1, wherein at least one marking holder of the plurality of marking holders has a visual marking.

3. The kite system of claim 1, wherein the kite system comprises a blocking mechanism that acts between the hauling rope and the marking holder.

4. The kite system of claim 2, wherein when the at least one marking holder is in the entrained state, the blocking mechanism is held in a state that is engaged with the hauling rope by a spring force.

5. The kite system of claim 1, wherein the plurality of marking holders comprises first and second marking holders each having a blocking mechanism and the blocking mechanism of the first marking holder is held in a non-engaged state by engaging with the second marking holder.

6. The kite system of claim 5, wherein the blocking mechanism of the first marking holder in the non-engaged state interacts with a mandrel of the second marking holder, wherein the mandrel is disposed concentric with the hauling rope.

7. The kite system of claim 1, further comprising a monitoring installation for monitoring a length of a currently dispensed portion of the hauling rope.

8. The kite system of claim 7, wherein the fitting installation upon receiving a control command from the monitoring installation is configured to initiate the changeover between the entrained state and the free-running state.

9. The kite system of claim 1, wherein the fitting installation is configured to displace at least one marking holder of the plurality of marking holders to initiate a changeover between the free-running state and the entrained state.

10. The kite system of claim 1, further comprising a magazine for receiving the plurality of marking holders in the free-running state.

11. The kite system of claim 10, wherein a radial spacing between a tow point axis of the tow point and the magazine is smaller than a radial spacing between the tow point axis and a hauling rope exit of the tow point.

12. The kite system of claim 1, wherein the kite system is configured to utilize a hauling rope speed during changeover that is lower than a basic speed of the hauling rope.

13. The kite system of claim 1, wherein at least one marking holder of the plurality of marking holders has an external terminal that is configured for charging of a battery.

14. A method for operating a kite system, in which a hauling rope extends between a kite and a tow point, said kite system including a plurality of marking holders with at least one marking holder configured to change between an entrained state in relation to the hauling rope, and a free-running state in relation to the hauling rope, said method comprising:
dispensing said hauling rope through said at least one marking holder while said at least one marking holder is in the free-running state;
monitoring a length of said hauling rope dispensed through said at least one marking holder; and
changing the at least one marking holder from the free-running state in relation to the hauling rope to the entrained state in relation to the hauling rope once a predefined length of the hauling rope has been dispensed,
wherein, in the entrained state, a spacing of two neighboring marking holders of the plurality of marking holders is larger than 20 m.

15. A kite system comprising:
a kite;
a tow point device;
a hauling rope that extends between the kite and the tow point device;
first and second marking holder devices arranged to move on the hauling rope between the tow point device and the kite;
each of the first and second marking holder devices having a visual indicator and a clamp device configured to clamp onto a portion of the hauling rope to prevent movement;
a fitting installation device arranged between the tow point device and the kite and being configured to engage with the first and second marking holder devices, wherein an engagement between the fitting installation device and at least the first marking holder device includes initiating a changeover between an entrained state in relation to the hauling rope and a free-running state in relation to the hauling rope,
wherein, in the free-running state, the first marking holder device can move relative to the hauling rope, and
wherein, in the entrained state, the clamp device of the first marking holder device engages with a portion of the hauling rope and a spacing of the first and second marking holder devices is larger than 20 m.

16. The kite system of claim 15, further comprising a magazine for receiving the first and second marking holder devices in the free-running state.

* * * * *